(12) United States Patent
El-Rayes

(10) Patent No.: US 11,176,221 B2
(45) Date of Patent: Nov. 16, 2021

(54) GENERATING HIGH VOLUME ACCESSIBLE DOCUMENTS

(71) Applicant: CommonLook, Arlington, VA (US)

(72) Inventor: Ferass El-Rayes, Kanata (CA)

(73) Assignee: NetCentric Technologies Inc., Kanata (CA)

( * ) Notice: Subject to any disclaimer, the term of this patent is extended or adjusted under 35 U.S.C. 154(b) by 138 days.

(21) Appl. No.: 16/433,267

(22) Filed: Jun. 6, 2019

(65) Prior Publication Data

US 2020/0097515 A1    Mar. 26, 2020

Related U.S. Application Data

(60) Provisional application No. 62/735,720, filed on Sep. 24, 2018.

(51) Int. Cl.
| | | |
|---|---|---|
| *G06F 17/00* | (2019.01) | |
| *G06F 16/957* | (2019.01) | |
| *G06F 16/838* | (2019.01) | |
| *G06F 40/117* | (2020.01) | |

(52) U.S. Cl.
CPC ........ *G06F 16/9577* (2019.01); *G06F 16/838* (2019.01); *G06F 40/117* (2020.01)

(58) Field of Classification Search
CPC ... G06F 16/9577; G06F 16/838; G06F 40/117
See application file for complete search history.

(56) References Cited

U.S. PATENT DOCUMENTS

| | | | | |
|---|---|---|---|---|
| 6,034,689 | A * | 3/2000 | White | H04N 21/25891 |
| | | | | 715/854 |
| 8,527,861 | B2 * | 9/2013 | Mercer | G06F 16/9577 |
| | | | | 715/206 |
| 9,841,863 | B1 * | 12/2017 | Totale | G06F 3/048 |
| 10,409,882 | B2 * | 9/2019 | Dey | G06F 3/0482 |
| 10,423,709 | B1 * | 9/2019 | Bradley | G06F 40/279 |
| 10,444,934 | B2 * | 10/2019 | Bradley | H04L 67/22 |
| 10,599,741 | B2 * | 3/2020 | Corlett | G06F 40/166 |
| 10,650,185 | B2 * | 5/2020 | Wen | G06F 40/137 |
| 10,657,320 | B1 * | 5/2020 | Dobier | G06F 40/174 |
| 10,866,691 | B1 * | 12/2020 | Bradley | G06F 40/14 |
| 10,867,120 | B1 * | 12/2020 | Bradley | G06F 40/186 |
| 10,896,286 | B2 * | 1/2021 | Bradley | G06F 40/14 |
| 2014/0089772 | A1 * | 3/2014 | Shetty | G06F 16/958 |
| | | | | 715/206 |

* cited by examiner

*Primary Examiner* — Mohammed H Zuberi
(74) *Attorney, Agent, or Firm* — Nixon & Vanderhye PC

(57) ABSTRACT

An architecture for generating accessible documents uses a Data/Layout Description Language (D/LDL) and data sources. The D/LDL and the data source are fed to a pre-processing module which generates an intermediate document containing all the data and positioning hints and structural information required to create the accessible file. The intermediate file is converted into an object model using a Model Builder and is passed to a Model Formatter to calculate the exact positioning of elements. The object model is then passed to a Standard formatter to ensure compliance with required standards and is then passed to a model writer which translates the object to an accessible file in the required format. The design allows for skipping the preprocessing module if the full file is available and allows to plug different model writers for different formats.

18 Claims, 5 Drawing Sheets

Scenario 1: Populating the layout file from data source(s)

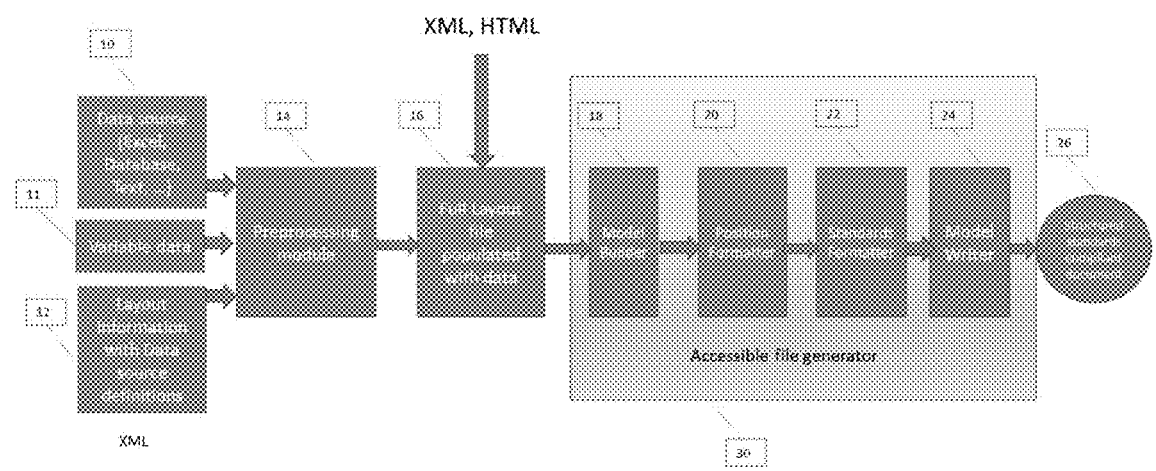
Figure 1: Overall description

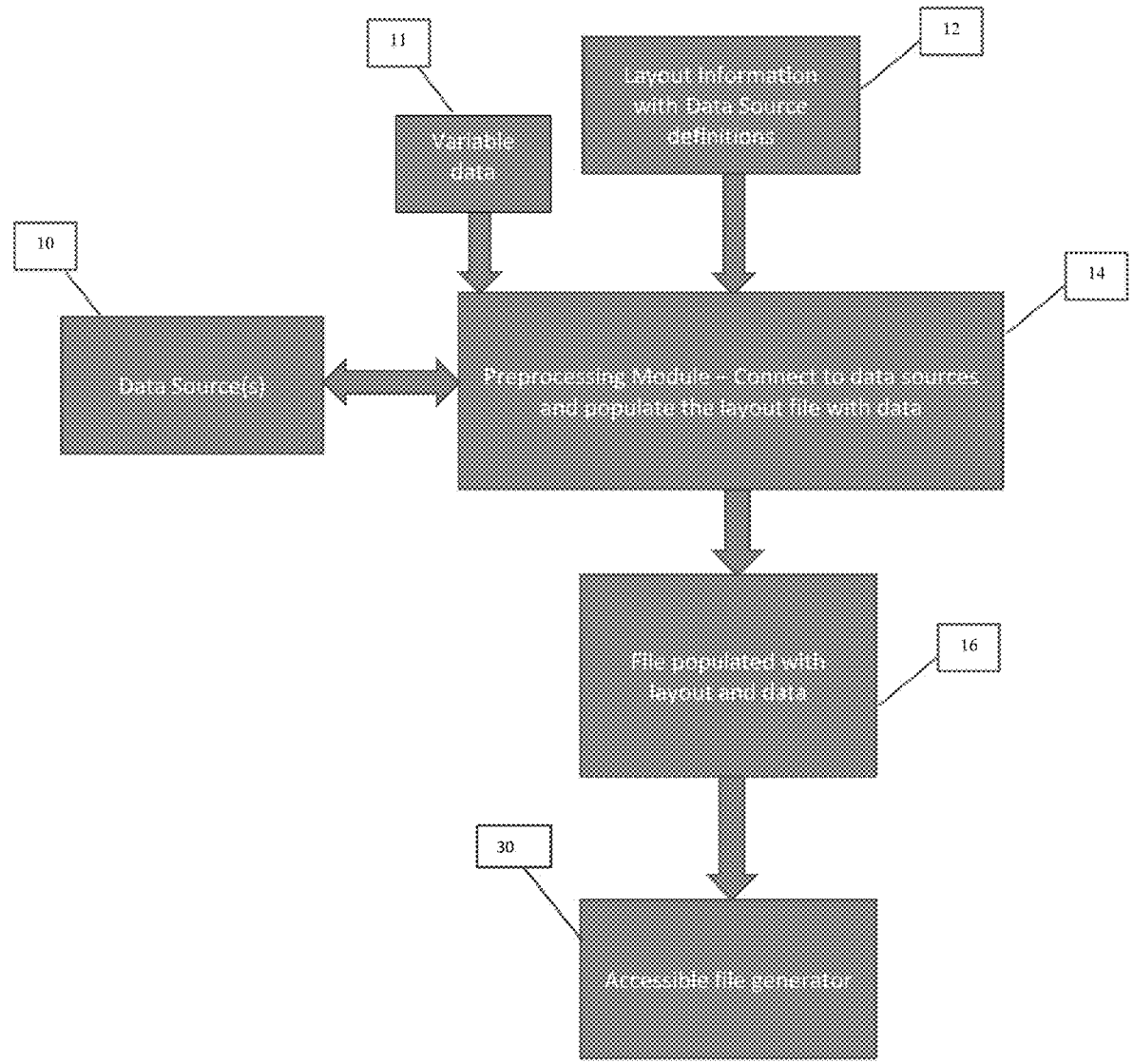
Figure 2: Scenario 1: Populating the layout file from data source(s)

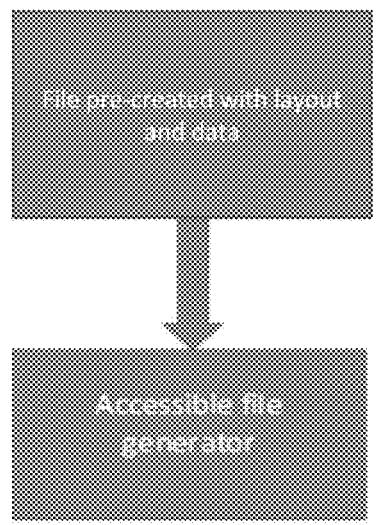
*Figure 3: Scenario 2: File pre-created with layout and data*

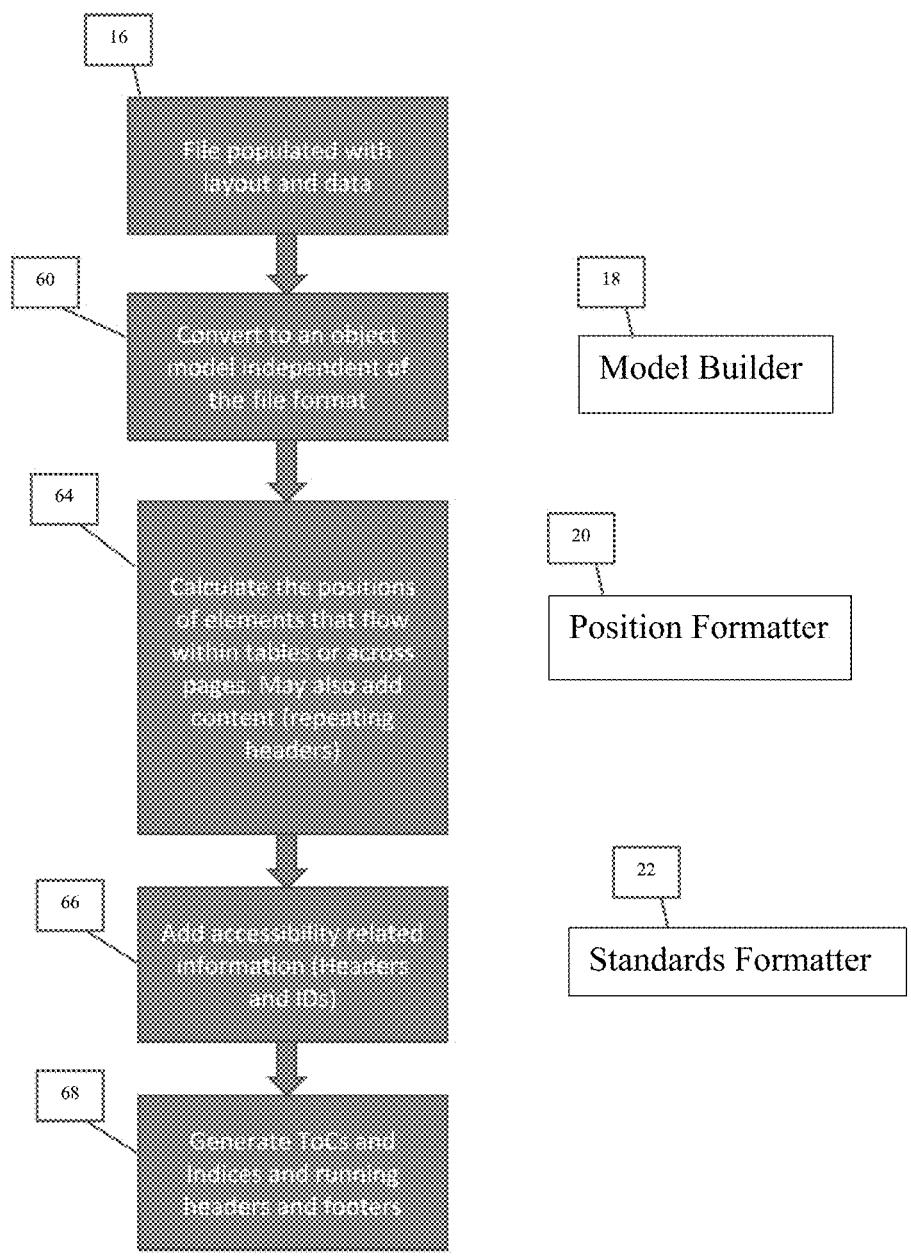
Figure 4 Model building and preparing for writing document

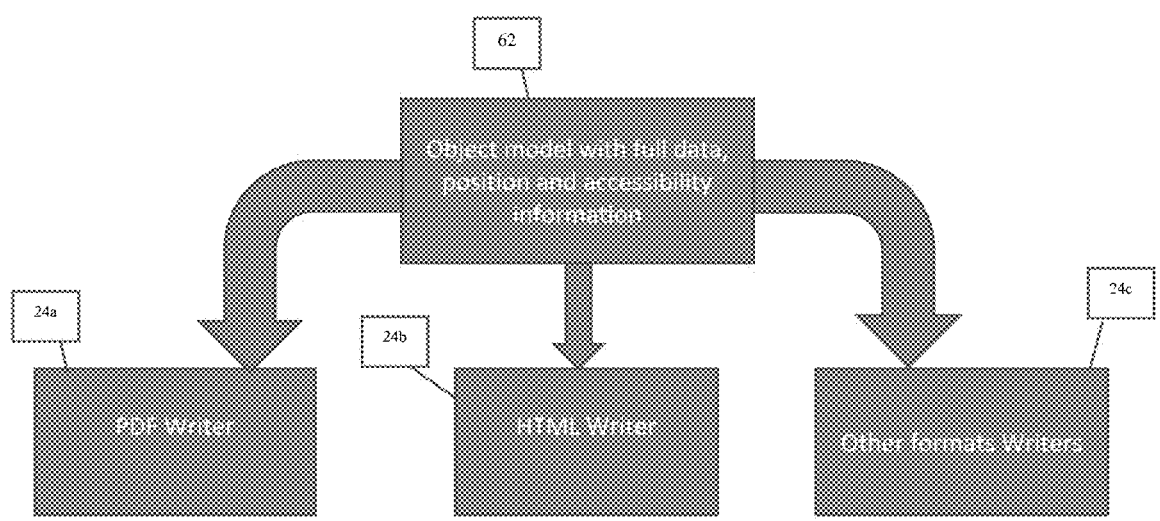
Figure 5 Converting model to a standards-compliant file

GENERATING HIGH VOLUME ACCESSIBLE DOCUMENTS

CROSS-REFERENCE TO RELATED APPLICATIONS

This application claims benefit of U.S. Provisional Application No. 62/735,720 filed Sep. 24, 2018; and is related to U.S. patent application Ser. No. 14/545,850 filed Jun. 29, 2015, published as US 2016/0378745 A1. These prior applications are incorporated herein by reference.

STATEMENT REGARDING FEDERALLY SPONSORED RESEARCH OR DEVELOPMENT

None.

FIELD

The technology herein relates to computer science, and more particularly to digital documents and accessibility.

BACKGROUND

The baby boomer phenomenon and other factors such as higher quality medical care has resulted in an increased percentage of older people in the general population. For example, approximately 15% of the US population was over 65 years of age in 2016. 27% of men and 15% of women aged 65 and older are expected to be in the labor force by 2022. Meanwhile, the average life expectancy in the United States was 79 in 2013. With statistics showing an increasing number of older Americans, the need for assistive technologies can be expected to increase significantly.

Several standards exist to regulate the generation of digital documents. The Web Content Accessibility Group (WCAG) of the World Wide Web Consortium (W3C) has developed WCAG 2.0 which many governments have either adopted (Section 508) or based their own standards on (The Health and Human Services Standard (HHS)). The International Standards Organization (the owner of the PDF format) has also developed Portable Document Format for Universal Accessibility (PDF/UA, or ISO 14289-1).

These standards restrict certain features and require implementing others in documents to facilitate accessibility to a wide variety of disabilities and also to ensure accessibility to the widest types of devices possible (e.g., Tables, Smart Phones, etc.).

Some of the requirements for accessible document generation include:
  Determining the correct structure of the document (also called tags). This is a complex problem, as some of the challenges include
  "guessing" which parts of the document are:
    Tables vs. multi-column formats.
    Header cells vs. data cells.
    Headings and heading levels
    Lists and nested lists
    References and foot/end notes
    Artifacts (not part of the real content of the document, for example, pagination, running headers and footers, watermarks, . . . )
  Providing Alternate description of non-textual elements including:
    Figures
    Links
    Form fields
  Providing other meta data including:
    Document meta data
      Author
      Subject
      Keywords
      Title
      Language
    Tag meta data
      Header cell scope (column, row or both)
      Headers cells assigned to data cells via IDs.
      ListNumbering
      Changes in Language Automated processes that attempt to determine this information after the document has been generated are generally error prone (if not impossible altogether).

With formats such as PDF, where structure is completely separate from presentation and layout, this is more of a problem as the majority of documents tend to be created without structure at all. Also, documents can be created without reliable Unicode mapping and missing spaces between words or between lines.

Features in products today exist to attempt to guess the structure of the document from the way it is laid out on the page (for example, Adobe's Add Tags to Document feature), which applies pattern recognition to come up with this structure. However, this method typically fails for any document containing relatively complex structures (e.g., tables, lists).

Other products have tried to map documents to existing templates containing structural information (see e.g., US 2016/0070677 A1). This method fails to resolve issues related to Unicode encoding and missing spaces.

BRIEF DESCRIPTION OF THE DRAWINGS

The following detailed description of exemplary non-limiting illustrative embodiments is to be read in conjunction with the drawings of which:

FIG. 1 shows an example non-limiting overall system;

FIG. 2 shows an example non-limiting scenario for populating a layout file from one or more data source(s);

FIG. 3 shows an example non-limiting scenario for a file pre-created with layout and data;

FIG. 4 shows an example non-limiting model building and preparing for writing a document; and FIG. 5 shows an example non-limiting converting of a model to a standards-compliant file.

DETAILED DESCRIPTION OF PREFERRED EMBODIMENTS

FIG. 1 shows a proposed solution that is based on creating an accessible Layout file using a Data/Layout Description Language (D/LDL) with placeholders for data from data sources and variable data. There would typically be one file per document type.

The FIG. 1 example non-limiting system includes a data source 10 such as an excel spreadsheet, a database, a text document, etc. and Variable data 11. The system also provides layout information 12 including data source definitions. This accessible/standards-compliant "skeleton" guarantees generating accessible documents as the skeleton itself is accessible and contains all the required information/meta data.

A preprocessing module 14 (see FIG. 2) populates the Layout file 16 with data from data sources 10 and variable data 11 and generates a full file complete with layout hints and data.

In another example non-limiting process, users bypass the pre-processing module 16 (see FIG. 3) if they are able to otherwise generate the full file complete with layout hints and data.

The full file is passed to a Model Builder 18 which converts the populated D/LDL file into an object model serving as an abstract layer between the D/LDL and the standard compliant document. The Position formatter 20 and Standards formatter 22 allows either or both of the populated D/LDL file and the structured standard compliant document to change without affecting the other. The same D/LDL file could be mapped into different standard compliant documents complying with different standards. Conversely, it is also possible for different D/LDL files to map into the same or similar standard compliant document.

The abstraction or middleware provided by Position formatter/Standards formatter 20 provides an intermediate, abstracted representation of the document called an "object model" that is disassociated from both the input and the output. The disclosed embodiment provides tools to convert between the D/LDL file and an abstract object model or representation, and tools being provided to convert between the abstract object model or representation and the desired standard compliant document.

The intermediate abstract model or representation may often contain all the information within the D/LDL file in a different form, although in some embodiments there can be a loss of superfluous information in converting the D/LDL file to the abstract object model or representation. Similarly, the intermediate object model or representation typically contains all the information needed to produce the standard compliant document, although in some embodiments this conversion may add information to the standard compliant document that is not present in the abstract model or representation.

The Position Formatter 20/Standards Formatter 22 (see FIG. 4) will populate the object model with exact positioning information and add additional accessibility related attributes (Table header IDs) and pass the generated model to a "Format Writer" 24.

The Format Writer 24 (see FIG. 1, FIG. 5) converts the model to a desired file format (for example, PDF, HTML . . . etc.). The model has enough information to generate a page-based (for example PDF) or non-page-based (for example HTML) file representing a structured, standards-compliant document 26. Different Format Writers 24 can be provided to convert the same object model into different standards compliant documents to provide a plurality of standards compliant document representations that comply with a plurality of different associated standards. For example, the same object model can be written to an html format, a pdf format, etc.

Example Non-Limiting Pre-processing Module 14

The Pre-processing module 14 (see FIG. 2) receives as input an XML layout file using a Data/Layout Description Language. This language allows specifying elements that repeat on the top of each page (UpperBit), others that repeat on the bottom of the page (LowerBit) in addition to elements to "flow" in the document (possibly crossing page boundaries). Flow elements allow specifying number of columns, margins, and other flow formatting of the page.

Elements can be described in fixed positions on specific pages or flowing one after the other. The language also provides for specifying data sources 10 (specified as OLEDB (Object Linking and Embedding Database) connection strings) and queries within these sources. These queries can be used to specify fields that get populated as the values (text) in certain tags.

Variables 50 may be declared so that users may pass custom data to the pre-processor 14 which replaces any occurrence of this variable with this value.

The D/LDL also provides for specifying tags (structure types), attributes (Alternative Text, Scope, ListNumbering, Artifact subtypes and much more) in addition to Metadata.

It also provides for specifying that certain strings are "special strings," allowing them to be replaced with ActualText (for example special characters or special abbreviations).

There are also constructs allowing for the automatic creation of common structures such as Tables of Content, Indices, running headers or footers based on Headings, odd/even pages, page labels and page numbers.

The output of the pre-processing module 14 is the layout file 16 with all variables replaced, all queries run and their tags populated with their corresponding entries.

Example Non-Limiting Model Builder 18

The Model builder 18 (see FIG. 4) receives a fully populated D/LDL file and converts it into an object model 62 that is independent of the file format (block 60). This object model 62 provides for an abstraction layer between the D/LDL and the Position formatter 20 thus allowing changes in the format used to specify the D/LDL file without changing the position formatter 20 or the accessibility formatter 22.

Example Non-Limiting Position Formatter 20/Accessibility Formatter 22

The position formatter 20 (see FIG. 4) calculates the exact position of every element taking into account the page size, the number of columns, the column width, table cell width and other attributes specified in the D/LDL (space after elements, paragraph spacing, font size, . . . etc.). See block 64. It may also add additional elements in the document (repeating table header cells for tables spanning multiple pages).

The position formatter 20 is also responsible for creating dynamic entities such as tables of content and indices as these require calculating the positions of all elements in order to be able to create the corresponding links in the tables of content and the index.

Certain running headers and footers are also created by the position formatter 20.

The accessibility or "standards" formatter 22 calculates attributes such as the header IDs assigned to every table cell. This adds accessibility related information (headers and IDs).

The output of these modules is a model complete with all information required to render the document into any supported format.

Example Non-Limiting Format Writers 24

The format writer 24 (see FIG. 5) translates the complete model into a specific format (for example PDF, HTML, XML, other markup language, or any other desired presentation format for display or other presentation to a user). Some properties may be ignored in some formats (for example pagination information in a single HTML file). Different format writers may be used for different formats. For example, a PDF writer 24a can be used to write PDF compliant document files, an HTML writer 24b can be used to write HTML (web browser) compliant page files, and other format writers 24c can be used to write other standard compliant presentation files.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A method for generating a presentation file comprising:
   (a) accessing a layout file, the layout file using a Data/Layout Description Language (D/LDL) comprising positioning information and accessibility information with placeholders for variable data, from one or more different data sources, including at least one of a database, different file formats and user provided variable data;
   (b) populating the layout file with data obtained from the one or more different data sources;
   (c) automatically converting the populated layout file to an object model-that-serves as an abstraction layer between the D/LDL and an accessibility standard-compliant document format;
   (d) calculating the positions of elements within the object model that flow within tables or across pages;
   (e) adding accessibility related information to the object model; and
   (f) converting the object model to the accessibility standard-compliant document format.

2. The method of claim 1 wherein converting (f) comprises converting the object model to a selected one of a plurality of different accessibility standard-compliant document formats.

3. The method of claim 2 wherein one of the plurality of different accessibility standard-compliant document formats comprises a portable document format (PDF).

4. The method of claim 2 wherein one of the plurality of different accessibility standard-compliant document formats comprises hypertext markup language (HTML).

5. The method of claim 2 wherein one of the plurality of different accessibility standard-compliant document formats comprises markup language.

6. The method of claim 1 wherein the adding comprises creating dynamic entities including tables of content, indices and running headers or footers based on headings including calculating the positions of elements in and corresponding links for the tables of content and the indices.

7. An apparatus for generating a presentation file comprising:
   at least one processor configured to execute instructions stored in non-transitory memory, the processor executing instructions to perform operations comprising:
   (a) accessing a layout file, the layout file using a Data/Layout Description Language (D/LDL) comprising positioning information and accessibility information with placeholders for variable data from different data sources including at least one of a database, file formats and user-provided variable data,
   (b) populating the layout file with data obtained from the one or more different data sources;
   (c) automatically converting the populated layout file to an object model having a format that is independent of a format of the populated layout file, the object model serving as an abstraction layer between the D/LDL and an accessibility standard-compliant document format;
   (d) calculating the positions of elements within the object model that flow within tables or across pages;
   (e) adding accessibility related information to the object model; and
   (f) converting the object model to an accessibility standard-compliant document format.

8. The apparatus of claim 1 converting comprises converting the object model to a selected one of a plurality of different accessibility standard-compliant document formats.

9. The apparatus of claim 2 wherein one of the plural different accessibility standard-compliant document formats comprises portable document format (PDF).

10. The apparatus of claim 2 wherein one of the plural different accessibility standard-compliant document formats comprises hypertext markup language (HTML).

11. The apparatus of claim 2 wherein one of the plural different accessibility standard-compliant document formats comprises markup language.

12. The apparatus of claim 1 wherein the adding comprises (i) creating dynamic entities including tables of content and indices and (ii) calculating the positions of elements in and corresponding links for the tables of content and the indices.

13. The apparatus of claim 7 wherein at least one processor is configured to allow changes in a format used to specify the D/LDL file without changing position formatting and accessibility formatting.

14. The apparatus of claim 7 wherein the at least one processor is further configured to calculate the position of every element taking into account page size, number of columns, column width, table cell width and other attributes specified in the D/LDL.

15. The apparatus of claim 7 wherein the at least one processor is further configured to calculate accessibility attributes comprising header IDs assigned to every table cell.

16. The method of claim 1 further including allowing changes in a format used to specify the D/LDL file without changing position formatting and accessibility formatting.

17. The method of claim 1 further including calculating position of every element taking into account page size, number of columns, column width, table cell width and other attributes specified in the D/LDL.

18. The method of claim 1 further including calculating accessibility attributes comprising header IDs assigned to every table cell.

* * * * *